United States Patent [19]
Hohl et al.

[11] 4,300,106
[45] Nov. 10, 1981

[54] LARGE VOLUME MULTIPLE-PATH NUCLEAR PUMPED LASER

[75] Inventors: Robert A. Frosch, Administrator of the National Aeronautics and Space Administration, with respect to an invention of Frank Hohl, Newport News; Russell J. De Young, Hampton, both of Va.

[73] Assignee: The United States of America as represented by the Administrator of the National Aeronautics and Space Administration, Washington, D.C.

[21] Appl. No.: 41,141

[22] Filed: May 21, 1979

[51] Int. Cl.³ .............................................. H01S 3/05
[52] U.S. Cl. ........................ 331/94.5 C; 331/94.5 P; 331/94.5 D
[58] Field of Search ................... 331/94.5 C, 94.5 P, 331/94.5 PE, 94.5 G

[56] References Cited

U.S. PATENT DOCUMENTS

| | | | |
|---|---|---|---|
| 3,660,778 | 5/1972 | LeBlanc, Sr. | 331/94.5 C |
| 4,001,705 | 1/1977 | Sinclair et al. | 331/94.5 C |
| 4,110,703 | 8/1978 | Jalufka et al. | 331/94.5 P |

*Primary Examiner*—William L. Sikes
*Assistant Examiner*—Léon Scott, Jr.
*Attorney, Agent, or Firm*—Howard J. Osborn; John R. Manning; William H. King

[57] ABSTRACT

A large volume multiple-path nuclear pumper laser which has improved characteristics over previous cylindrical nuclear pumped laser systems. Large volumes of gas are excited by using internal high reflectance mirrors that are arranged so that the optical path crosses back and forth through the excited gaseous medium. By adjusting the external dielectric mirrors of the laser, the number of paths through the laser cavity can be varied. Output powers have been obtained that are substantially higher than the output powers of previous nuclear laser systems.

4 Claims, 1 Drawing Figure

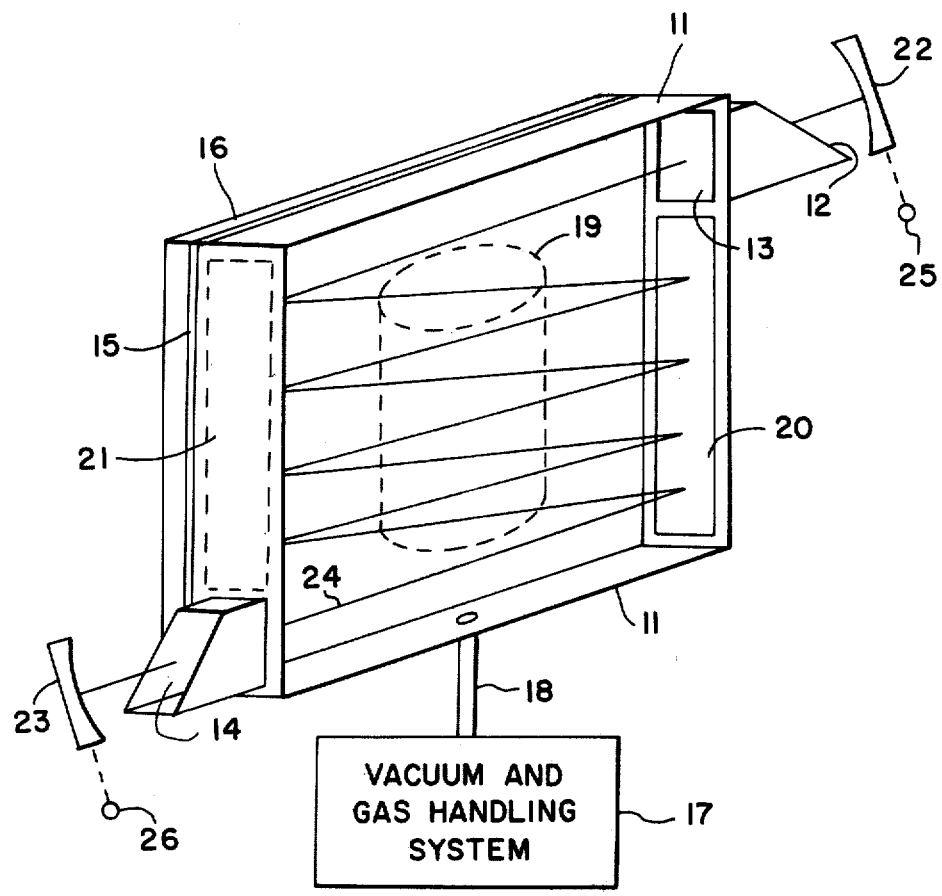

LARGE VOLUME MULTIPLE-PATH NUCLEAR PUMPED LASER

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

BACKGROUND OF THE INVENTION

The invention relates generally to lasers and more specifically concerns improvements in nuclear pumped lasers.

Gaseous lasers pumped directly by charged particles from nuclear reactions, called nuclear pumped lasers, have been in existence for several years. Typical reactions used to pump the laser medium are the $^3He(n,p)^3H$, $^{10}B(n,\alpha)^7Li$, and $^{235}U(n,ff)FF$ nuclear reactions. In particular, the $^3He(n,p)^3H$ reaction has shown great promise for higher power nuclear lasers in such systems as the $^3He$-Ar (1.79 $\mu m$). Previous nuclear pumped lasers consist of a quartz tube surrounded with polyethylene moderator and filled with $^3He$ plus some minority species gas such as Ar, Xe or Kr. Dielectric mirrors at the ends of the tube form the optical laser cavity. When this system is exposed to a fast-neutron burst, lasing occurs at various wavelengths in Ar, Xe, or Kr. For such cylindrical systems the lasing mode volume is relatively small, and thus power output is also low.

The primary object of this invention is to effectively increase the lasing mode volume of nuclear pumped lasers and to improve the neutron coupling efficiency with the external neutron source thereby increasing the power output.

Another object of this invention is to provide means for varying the power output of a nuclear pumped laser by varying the length of the optical path through the excited lasing medium in the nuclear pumped laser.

Other objects and advantages of this invention will become apparent hereinafter and in the drawing.

SUMMARY OF THE INVENTION

This invention is a nuclear pumped laser including a laser cavity containing the laser medium and two dielectric mirrors external to the laser medium. Two other high reflectance mirrors are located inside the laser medium such that the optical path through the laser medium between the two external dielectric mirrors crosses back and forth between the two high reflectance mirrors. Consequently, the length of the optical path through the laser medium is increased which results in an increase in power output. The orientation of the two external dielectric mirrors is adjustable so that the length of the optical path (number of paths) through the laser medium can be changed.

BRIEF DESCRIPTION OF THE DRAWING

The sole FIGURE in this application is a schematic diagram of the embodiment of the invention selected for illustration in the drawing.

DETAILED DESCRIPTION OF THE INVENTION

Turning now to the embodiment of the invention selected for illustration, the number 11 in the Figure designates the frame for the laser medium. The frame can be made from stainless steel. A Brewster angle window 12 is mounted in the upper right corner of frame 11 over an opening 13 through the frame. A Brewster angle window 14 is mounted in the lower left corner of frame 11 over an opening through the frame. Aluminum cover plates 15 are bolted to the front and back of frame 11 and are vacuum sealed with O-rings. Only the back cover plate 15 is shown in the drawing; the front cover plate is not shown to make it more convenient to describe the invention. Polyethylene moderators 16 are attached to the outside of the aluminum cover plates 15, both in the front and back. A vacuum and gas handling system 17 is connected to the laser cavity via a vacuum line 18. The gas handling system 17 is used to introduce gas into the laser cavity and to maintain the proper pressure of the gas. The vacuum system is used to evacuate the gas when desired. The gas can be $^3He$-Ar.

The polyethylene moderators 16 produce near thermal neutrons inside the laser cavity from the fast neutrons generated by a fast-burst rector 19 used as the neutron source for this embodiment of the invention. A gold or aluminum plane mirror 20 is mounted on the inside of frame 11 below opening 13 and a gold or aluminum plane mirror 21 is mounted on the inside of frame 11 above the opening in the frame. Dielectric coated mirrors 22 and 23 are located outside frame 11 in close proximity to Brewster angle windows 12 and 14, respectively, thus forming an optical cavity. Mirror 23 has a finite transmission which provides the output for the laser.

The optical path 24 of the laser is between mirrors 22 and 23, and folded back and forth by internal mirrors 20 and 21 through the laser medium. The number of times that the optical path crosses the laser medium (nine in the embodiment shown) and thus the length of the optical path through the laser medium is determined by the orientations of mirrors 22 and 23. The orientations of mirrors 22 and 23 can be changed by any suitable means 25 and 26, respectively, by tilting or rotating the mirrors to the right or left about the central axes of the mirrors. To properly align mirrors 22 and 23, the laser beam from a He-Ne alignment laser is passed through mirror 22 and mirror 23. The reflected He-Ne beam is caused to reflect back into the He-Ne laser thus describing a unique optical path. The positions of mirrors 22 and 23 can be adjusted thereby varying the number of optical paths traversing the laser medium.

The multiple path laser as disclosed in the FIGURE is designed to withstand pressures of several atmospheres of $^3He$ mixed with some minority species gas such as Ar or Xe. Fast neutrons produced by fast-burst reactor 19 are moderated by the polyethylene moderator 16 attached to the front and back of the laser. These thermalized neutrons enter the $^3He$ plus minority species gaseous medium and cause $^3He(n,p)^3H$ nuclear reactions to occur. These reactions produce charged particles of high kinetic energy which ionize and excite the He-minority species mixture creating a population inversion in the minority species gas. The photon flux is allowed to amplify in the optical cavity which is formed by the dielectric coated external laser mirrors 22 and 23. The output mirror 23 has a finite transmission which allows a portion of the photon flux (laser output) to escape from the optical cavity in the form of a laser beam.

One set of dimensions of a laser constructed in accordance with this invention is: 5 cm thick polyethylene moderator 16, 3 cm thick frame 11 with the internal dimensions of the frame being 40 cm between mirrors, 30 cm high and 3 cm wide.

The invention as disclosed is in the form of a rectangular structure. Alternate forms of the invention would include a cylindrical geometry where the laser cavity is made to reflect the laser emission around a cylindrical fast-burst reactor. The aluminum cover plates could also be coated with either $^{235}$U or $^{10}$B or some other solid fissionable material, thus providing a wall source of excitation. The use of $^{235}$UF$_6$ will allow operation as a self-critical volume pumped gaseous reactor-laser. The external laser cavity mirrors could also be mounted internally, thereby reducing optical loss from the Brewster angle windows.

By replacing the aluminum cover plates with a transparent window material, the invention could be used to pump a laser medium such as iodine by a photo flux. A photon flux, generated by a Xe flashlamp or carbon arc would pass through the window, photolyzing the gaseous medium. Lasing would occur transverse to the photon flux, just as in the nuclear excitation system. With this system, a highly absorbing laser gas can be pumped homogeneously.

The advantages of this invention are numerous: It has a higher laser output power with substantially lower input of thermal neutron flux when compared to previous cylindrical laser systems; it has a more efficient use of the reactor neutron flux by increasing the neutron capture area; it has a laser cavity path length that is adjustable as opposed to the cylindrical laser systems where the optical path length is fixed; the reactor neutron fluxes needed for lasing are approaching steady-state reactor fluxes; $^{235}$U wall coatings as well as $^{235}$UF$_6$ and $^3$He volumetric sources of excitation can be used; its physical system can be scalable to larger volumes and higher laser output powers; by using transparent cover plates, a large volume laser system could be homogeneously pumped by photons; and by careful design of moderators and use of $^{235}$H wall coatings or $^{235}$UF$_6$ and $^3$H volumetric sources of excitation a self-critical laser reaction can be achieved.

What is claimed is:

1. A laser comprising:
   an enclosure with first and second windows and containing a lasing medium;
   a first mirror with zero transmission located outside said enclosure adjacent said first window;
   a second mirror with finite transmission located outside said enclosure adjacaent said second window for providing the output for said laser;
   a third flat mirror;
   a fourth flat mirror;
   pumping means pumping radiation into the lasing medium to cause lasing along an optical path between the first and second mirrors;
   said first, second, third and fourth mirrors and said first and second windows being located and oriented such that the optical path is from the first mirror through the first window, through the lasing medium to the third mirror, through the lasing medium to the fourth mirror, back and forth several times between the third and fourth mirrors, through the second window to the second mirror, and then along the same path back to the first mirror whereby the optical path of the laser has a distance several times the distance across the laser medium; and
   means for changing the orientations of said first and second mirrors to alter the number of times the optical path goes back and forth between the third and fourth mirrors enroute between the first and second mirrors thereby changing the length of the optical path.

2. A laser according to claim 1 wherein said third and fourth mirrors are located inside said enclosure.

3. A laser according to claim 2 wherein said third and fourth mirrors are parallel to each other and are fixed relative to the enclosure.

4. A laser according to claim 1 wherein said pumping means is a fast-burst reactor means for generating fast neutrons to pump the laser whereby the laser is a nuclear pumped laser.

* * * * *